United States Patent [19]
Yagi et al.

[11] Patent Number: 5,349,858
[45] Date of Patent: Sep. 27, 1994

[54] ANGULAR ACCELERATION SENSOR

[75] Inventors: Takayuki Yagi, Machida; Yutaka Hirai, Tokyo; Osamu Takamatsu; Masaru Nakayama, both of Atsugi; Hiroyasu Nose, Zama; Katsuhiko Shinjo, Isehara; Yasuhiro Simada, Atsugi, all of Japan

[73] Assignee: Canon Kabushiki Kaisha, Tokyo, Japan

[21] Appl. No.: 826,867

[22] Filed: Jan. 28, 1992

[30] Foreign Application Priority Data

Jan. 29, 1991 [JP] Japan .................................. 3-029348

[51] Int. Cl.$^5$ ..................... G01P 15/08; G01P 15/125
[52] U.S. Cl. ............................. 73/517 A; 73/517 R
[58] Field of Search ............ 73/517 A, 517 B, 517 R, 73/505; 361/280, 283

[56] References Cited

U.S. PATENT DOCUMENTS

| | | | |
|---|---|---|---|
| 3,295,377 | 1/1967 | Richard | 73/517 A |
| 4,699,006 | 10/1987 | Boxenhorn | 73/517 AV |
| 4,736,629 | 4/1988 | Cole | 73/514 |

FOREIGN PATENT DOCUMENTS

| | | |
|---|---|---|
| 3824695 | 2/1990 | Fed. Rep. of Germany . |
| 2186085 | 8/1987 | United Kingdom . |

OTHER PUBLICATIONS

"Linear and Rotational Quartz Fiber Accelerometers for Geophysical and Inertial Use", B. Bartholomew, B. Block, and J. Dratler, Jr., *AIAA Journal*, vol. 11, No. 9, Sep. 1973, pp. 1227–1228.

"Semiconductor Capacitance-type Accelerometer with PWM Electrostatic Servo Technique", S. Suzuki and Techitani, et al., Sensors and Actuators, A21–A23 (1990) 316–319.

Petersen, Shartel & Raley, "Micromechanical Accelerator Integrated with MOS Detection Circuitry", *Electron Devices*, pp. 23–27 (Jan. 1987).

*Primary Examiner*—Hezron E. Williams
*Assistant Examiner*—Helen C. Kwok
*Attorney, Agent, or Firm*—Fitzpatrick, Cella, Harper & Scinto

[57] ABSTRACT

An angular acceleration sensor has a weight member, a resilient member for supporting the weight member from the both sides thereof, the resilient member being disposed on a predetermined rotational axis and supporting the weight member for rotation about the rotational axis, and an opposed member opposed to the weight member, an angular acceleration applied to the weight member being detected from a variation in the spacing between the opposed member and the weight member resulting from the rotation of the weight member

8 Claims, 8 Drawing Sheets

FIG. 1

PRIOR ART

ANGULAR ACCELERATION SENSOR

BACKGROUND OF THE INVENTION

1. Field of the Invention

This invention relates to a sensor for detecting information related to rotation, and particularly to an angular acceleration sensor suitable for the detection of a variation in the angle of a camera, a video camera or the like caused by hand vibration.

2. Related Background Art

Acceleration sensors now chiefly in use are of the piezo-electric type which uses the piezo-electric effect, or of the strain gauge type which uses a metallic resistor or a semiconductor. There has also been an attempt to form a cantilever (by silicon micromechanics technique), add a weight to the tip end thereof and make a compact acceleration sensor. For example, a system for detecting acceleration by the use of a variation in electrostatic capacity has been proposed by K. E. Petersen et al. ("Micromechanical Accelerometer Integrated with MOS Detection Circuitry", IEEE Trans. Electron Devices, vol. ED-29, p.23, 1982).

Figure 1:
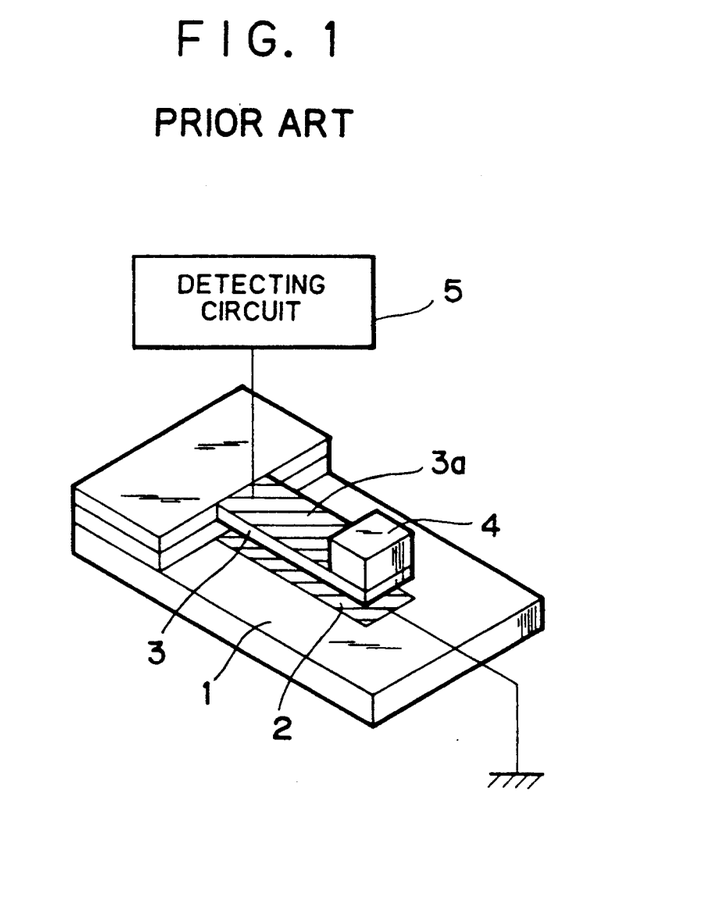
FIG. 1 shows the construction of an example of the prior art.

FIG. 1 of the accompanying drawings shows an example of the prior-art acceleration sensor which comprises a silicon substrate 1, an electrode 2, and a cantilever 3 formed on the silicon substrate 1 by microfabrication. The cantilever 3 is formed of oxidized film, and has a metallic electrode 3a formed on the upper surface thereof, and enhances its sensitivity to acceleration by a weight 4 provided on the tip end thereof. Any variation in the electrostatic capacity between the electrode 2 and the metallic electrode 3a is detected by a detection circuit 5 to thereby detect acceleration. Also, as a form of dis-position of the metallic electrode, there has been proposed a construction in which a metallic electrode is also disposed on the upper surface of the weight 4 (S. Suzuki, "Semiconductor Capacitance-type Accelerometer with PWM Electrostatic Servo Technique", Sensors and Actuators, A21–A23 (1990) 316–319).

Detection of angular acceleration is accomplished by disposing a plurality of such translational acceleration sensors in predetermined limitations relationship with each other, and finding the angular acceleration from the difference between detected accelerations.

However, the construction using a plurality of translational acceleration sensors is very difficult to realize in a compact camera or the like because of spatial limitations. Also, to improve accuracy, it is necessary to make uniform the characteristics and sensitivities of the acceleration sensors, and sensor adjustment becomes indispensable. Also, an offset output for the detection range produced by a variation in the direction of gravity to the translational acceleration sensors resulting from a change in the posture of the camera varies greatly and detection sensitivity cannot be enhanced.

SUMMARY OF THE INVENTION

It is a primary object of the present invention to provide a sensor which can directly detect information regarding rotation, particularly angular acceleration, simply and accurately by a compact construction.

Other objects of the present invention will become apparent from the following detailed description of some embodiments of the present invention.

DETAILED DESCRIPTION OF THE PREFERRED EMBODIMENTS

An angular acceleration sensor for achieving the above object according to each embodiment which will hereinafter be described is characterized by a weight, resilient members disposed on a rotational axis substantially passing through the center of gravity of said weight and rotatably supporting said weight on the opposite sides of said weight, a fixed electrode provided between said two resilient members in opposed relationship with said weight in a direction orthogonal to said rotational axis, and detecting means for detecting angular acceleration applied to said weight from a variation in electrostatic capacity corresponding to a variation in the spacing between said fixed electrode and said weight.

The angular acceleration sensor having the above-described construction is such that by the moment of inertia of the weight, a torque proportional to the angular acceleration about the axis acts on the weight and the weight rotates against a resilient force to the-torsion of the resilient members, whereby the electrostatic capacity between the weight and the electrode is varied.

The present invention will hereinafter be described in detail with respect to some embodiments thereof shown in FIGS. 2 to 13.

Figure 2:
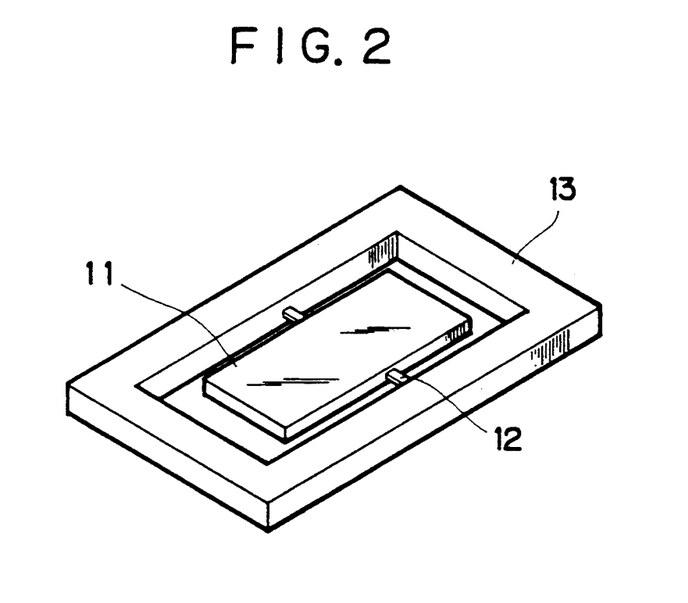
FIG. 2 shows the construction of portions of a first embodiment of the present invention.

Referring to FIG. 2 which shows the construction of portions of the angular acceleration sensor, a rectangular planar weight 11 is supported inside a frame-like base plate 13 by means of a support beam 12 at the midpoints of the longer sides of the weight 11. The weight 11, the support beam 12 and the base plate 13 are integrally formed from a silicon substrate by anisotropic etching, and the weight 11 is made slightly thinner than the base plate 13, and the support beam 12 slightly rotatably supports the weight 11 axisymmetrically.

Figure 3:
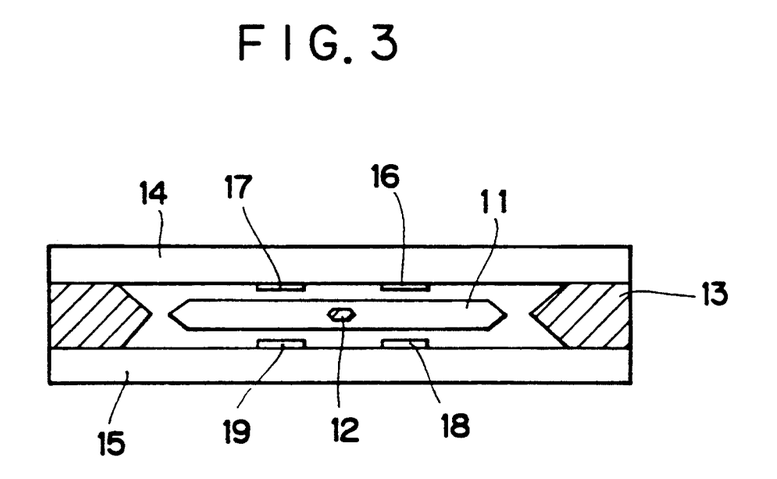
FIG. 3 is a cross-sectional view of the first embodiment.

Referring now to FIG. 3 which is a cross-sectional view of the angular acceleration sensor, the weight 11, the support beam 12 and the base plate 13 are sandwiched between glass plates 14 and 15. Fixed electrodes 16 and 17 are deposited by evaporation on the right and left, respectively, at locations on the underside of the glass plate 14 which are opposed to the weight 11, and fixed electrodes 18 and 19 are likewise deposited by evaporation on the upper surface of the glass plate 15, and the spacing between the glass plate 14, 15 and the weight 11 is of the order of several $\mu m$.

Figure 4:
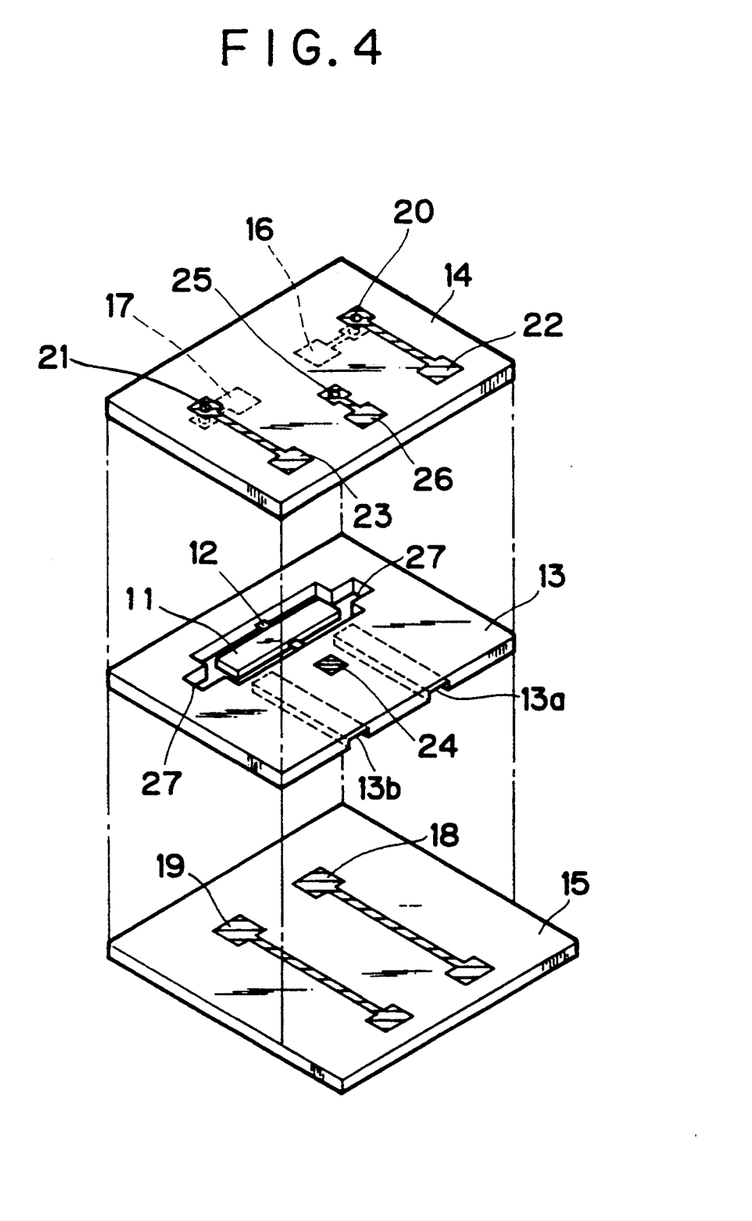
FIG. 4 is an exploded perspective view of the first embodiment.

Referring now to FIG. 4 which is an exploded perspective view of the angular acceleration sensor, a plurality of through-hole electrodes for drawing out electrodes therethrough are formed on the glass plate 14. Each of these through-hole electrodes comprises an electrically conductive portion formed by the plating method inside a through-aperture formed by a method such as laser working or sand blasting, and each electrode is thereafter deposited by evaporation. The through-hole electrodes 20 and 21 are connected to the fixed electrodes 16 and 17, respectively, on the underside of the glass plate 14, and these are connected to draw-out electrodes 22 and 23, respectively, on the upper surface of the glass plate 14. Also, the electrode of the weight 11 is such that a draw-out electrode 26 is connected to an electrode 24 on the upper surface of the base plate 13 through the through-hole electrode 25 of the glass plate 14. The glass plate 15 is larger than the base plate 13, the fixed electrodes 18 and 19 are intactly drawn out, and grooves 13a and 13b are formed in the underside of the base plate 13 by etching so that the fixed electrodes 18 and 19 may not contact with the base plate 13. Also, a through portion 27 is provided in the base plate 13 with a widened spacing with respect to the weight 11 so that those portions of the fixed electrodes 16 and 17 which are connected to the through-hole electrodes 20 and 21 may not contact with each other.

The glass plates 14 and 15 thus formed with electrodes, etc. are joined to the base plate 13, as shown in FIG. 3. Pyrex glass which is approximate in coefficient of thermal expansion to silicon is used for the glass plates 14 and 15, which are joined to the base plate as by the anode joining method. This anode joining method comprises heating the glass to a high temperature of about 400° C., applying a negative voltage ($-500$ V) to the glass side, and joining the glass to the base plate by an electrostatic force acting on the interface between the glass and silicon, and is great in joint strength and can accurately accomplish joining. After the joining, the through-hole electrode 25 and the draw-out electrode 26 are connected together as by solder or electrically conductive epoxy.

Figure 5:
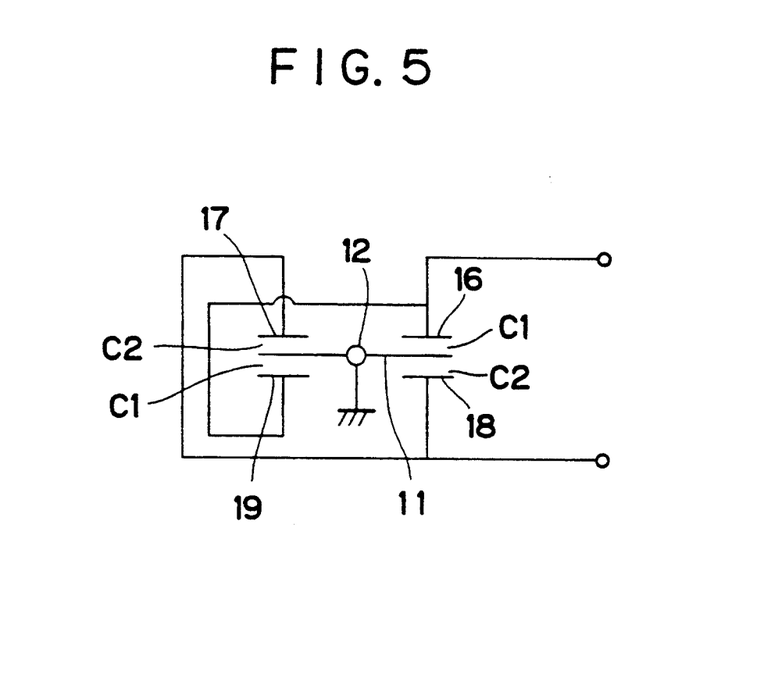
FIG. 5 is a diagram of the equivalent circuit of the detecting portion of the first embodiment.

Referring to FIG. 5 which is a diagram of the equivalent circuit of a detecting portion, the weight 11 supported by the support beam 12 comprises one portion of each of a pair of capacitors (a "weight side electrode" in each capacitor) held at a con, non ground potential and opposed to the fixed electrodes 16–19, and pivots about the support beam 12, whereby the capacity of each of the capacitors is varied. The fixed electrode 16 and the fixed electrode 19 are electrically connected together to thereby constitute a capacitor C1 between them and the weight 11, and the fixed electrode 17 and the fixed electrode 18 are connected together to thereby constitute a capacitor C2 between them and the weight 11.

Figure 6:
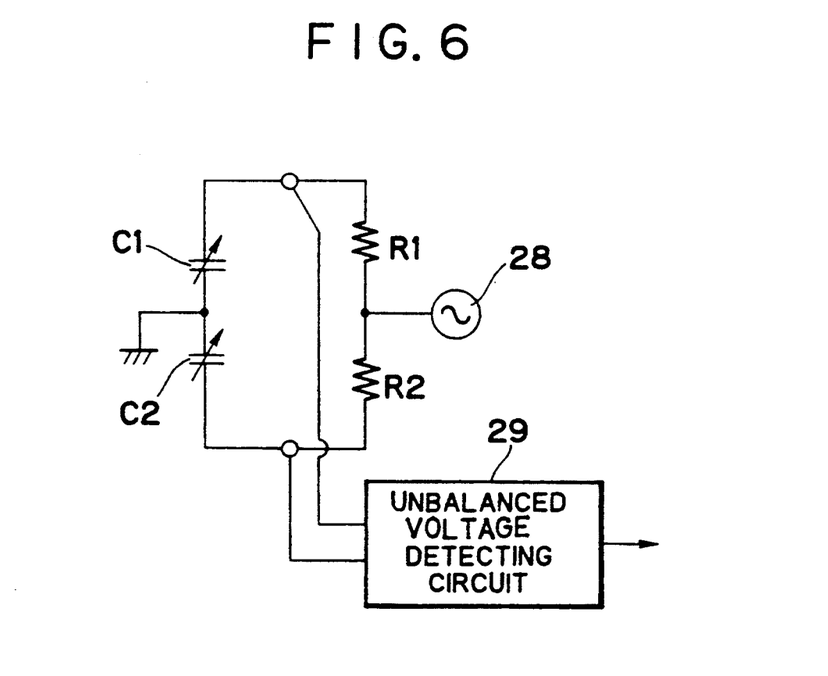
FIG. 6 shows the construction of the detection circuit of the first embodiment.

Referring to FIG. 6 which shows the construction of a detection circuit, resistors R1 and R2 are connected to the aforementioned capacitors C1 and C2 to thereby constitute a bridge circuit, and an oscillator 28 and an unbalanced voltage detecting circuit 29 are connected to this bridge circuit. The unbalanced voltage detecting circuit 29 is comprised of a full wave rectifying circuit, a low-pass filter and a differential amplifier, and takes out the amplitude value of a high frequency and amplifies an unbalanced voltage.

In such a construction, when an angular acceleration with the support beam 12 as the axis is applied, the weight 11 pivots relative to the base plate 13 and stops at an angle whereat the resilient force to the torsion of the support beam 12 and the moment of inertia of the weight 11 (which is proportional to the angular acceleration applied to the weight) are balanced. At this time, variations in the electrostatic capacities of the fixed electrodes 16 and 19 with respect to the weight 11 are of the same phase and therefore, the capacity of the capacitor C1 varies. The capacity of the capacitor C2 also varies likewise, but in the opposite phase to that of the capacitor C1. Therefore, when a high frequency of constant amplitude is applied from the oscillator 28 to the bridge circuit, an unbalanced voltage by variations in the impedances of the capacitors C1 and C2 is applied to the input of the unbalanced voltage detecting circuit 29. This unbalanced voltage is a function of the angular acceleration and accordingly, by detecting this unbalanced voltage, the minute rotation of the weight 11 is detected efficiently, and the output of the unbalanced voltage detecting circuit 29 is converted into an angular acceleration (for example, by a calculator, not shown, on the basis of the pre-obtained relation between the unbalanced voltage and the angular acceleration). Also, by a plurality of electrodes being thus disposed on each of the upper and lower surfaces, the translational acceleration component of the gravity or the like applied to the planar plate is cut at the output of the unbalanced voltage detecting circuit 29, and only the angular acceleration can be detected.

Figure 7:
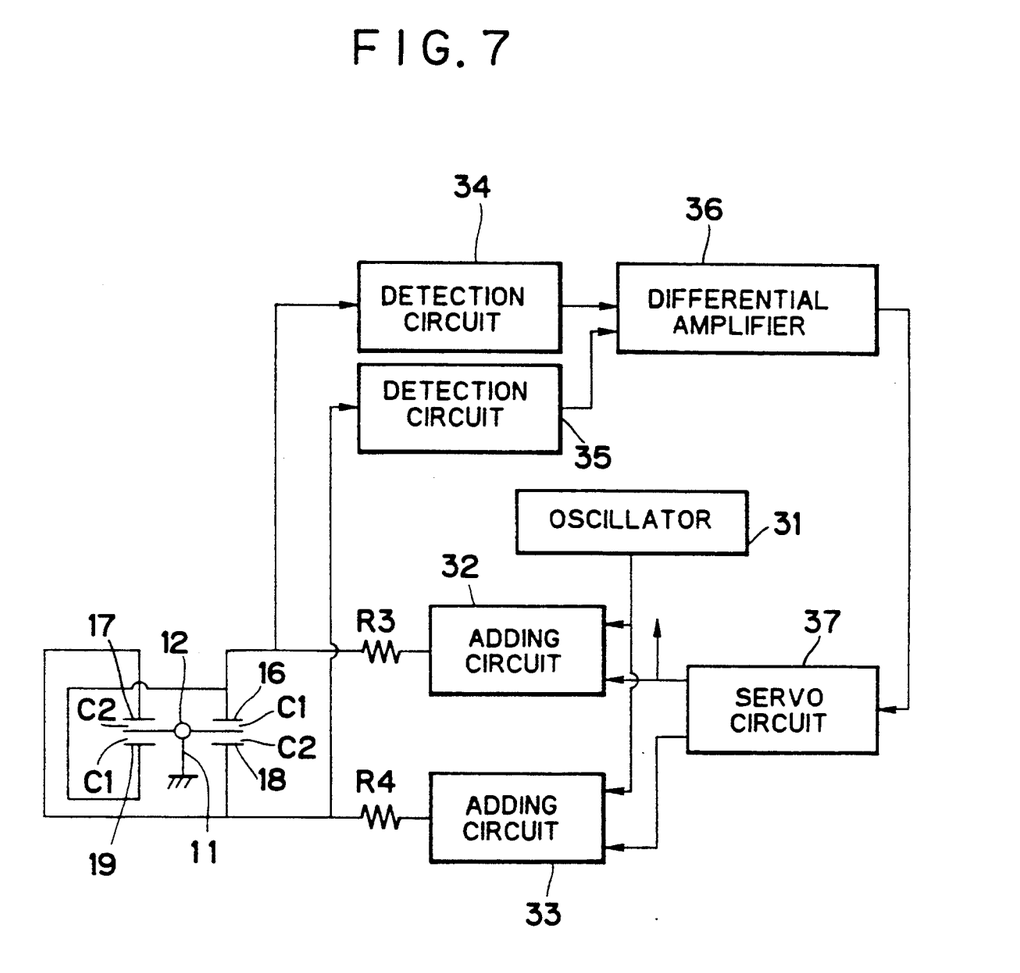
FIG. 7 diagrammatically shows the circuit construction of a second embodiment of the present invention.

FIG. 7 shows the circuit construction of a second embodiment, and the detecting portion of the sensor of this embodiment is the same as that of the first embodiment shown in FIG. 4. The output of an oscillator 31 is input to an adder 32 and an adder 33, and the output of the adder 32 is connected to the fixed electrodes 16, 19, i.e., the capacitor C1, through a resistor R3, and the output of the adder 33 is connected to the fixed electrodes 17, 18, i.e., the capacitor C2, through a resistor R4. The capacitor C1 is connected to the input of a detection circuit 34, and the capacitor C2 is connected to the input of a detection circuit 35. The detection circuits 34 and 35 each comprises a band-pass filter and a full wave rectifying circuit, and the outputs thereof are connected to the input end of a differential amplifier 36, the output of which is input to a servo circuit 37. The two outputs of the servo circuit 37 are connected to the input ends of the adders 32 and 33, and the design is such that when the angle of rotation of the weight 11 deviates from the neutral position, a driving voltage is applied so that the weight 11 may be returned to the neutral position by the electrostatic forces of the fixed electrodes 16–19 through the adders 32 and 33.

When the angle of rotation of the weight 11 deviates from the neutral position, the impedances of the capacitors C1 and C2 vary and the partial voltage of the high frequency component varies and therefore, a difference is created between the outputs of the detection circuits 34 and 35, and these outputs are amplified by the differential amplifier 36 and converted into driving voltages in the servo circuit 37, and the driving voltages are applied to the fixed electrodes 16–19 through the adders 32, 33 and the resistors R3, R4. By such feedback, the weight 11 is held in the neutral position, and since the output of the servo circuit 37 is proportional to the angular acceleration about the axis of the support beam 12 applied to the sensor, the voltage of the servo circuit 37 is taken out by finding a proportion constant in advance through an experiment or the like, whereby the angular acceleration can be detected. By using such detection circuits, the measurement range is widened and sensitivity is improved.

Figure 8:
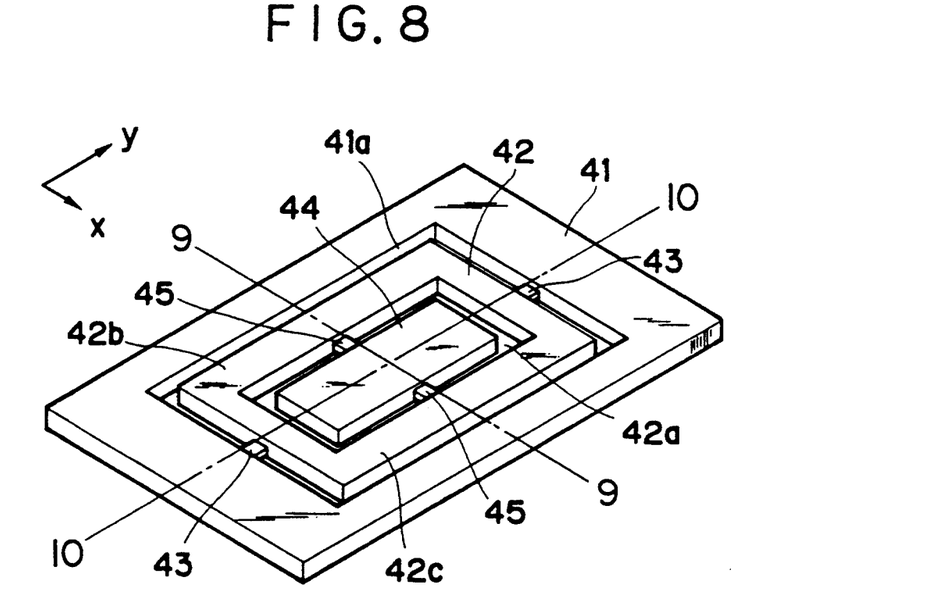
FIG. 8 shows the construction of portions of a third embodiment of the present invention.

FIG. 8 shows the construction of portions of a third embodiment, and this embodiment is one in which the first embodiment is applied to two axes. A rectangular frame-like base plate 41 is formed with a through-aperture 41a located centrally thereof, in which a frame-like weight 42 thinner than the base plate 41 is supported by the base plate 41 through support beams 43, 43 lying on straight lines parallel to the y-axis passing through the center of gravity, i.e., the center of gravity of a structure including the weight 42 and the portion inward from the weight 42. Further, a rectangular planar weight 44 long in the direction of the y-axis is disposed in the central through-aperture 42a in the weight 42, and the weight 44 is supported on the weight 42 by support beams 45, 45 lying on the straight lines passing through the center of gravity of the weight 44 and parallel to the x-axis. The base plate 41, the weights 42, 44 and the support beams 43, 45 are integrally formed from a silicon substrate by anisotropic etching. The weight 42 is slightly pivotable about the y-axis relative to the base plate 41 with the support beams 43 as the axis, and that portion thereof which is longer in the x direction than the through aperture 42a provides rectangular weight portions 42b and 42c. The weight 44 is slightly pivotable about the x-axis relative to the weight 42 with the support beams 45 as the axis.

Figure 9:
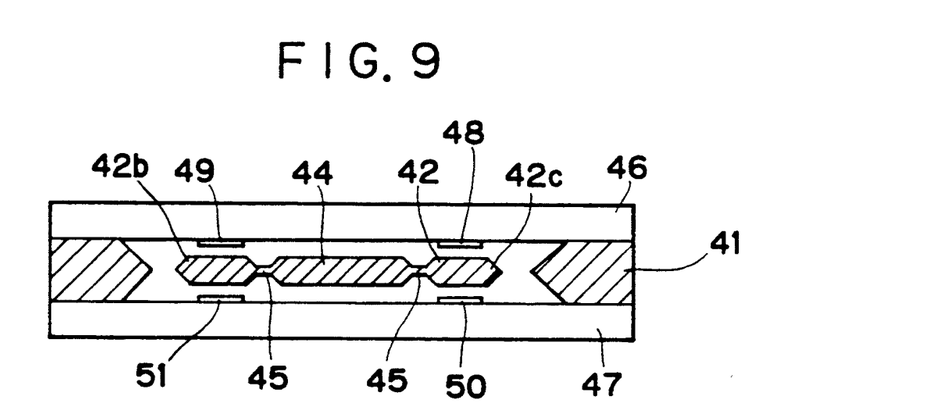
FIG. 9 is a cross-sectional view of the third embodiment taken along line A—A of FIG. 8.
Figure 10:
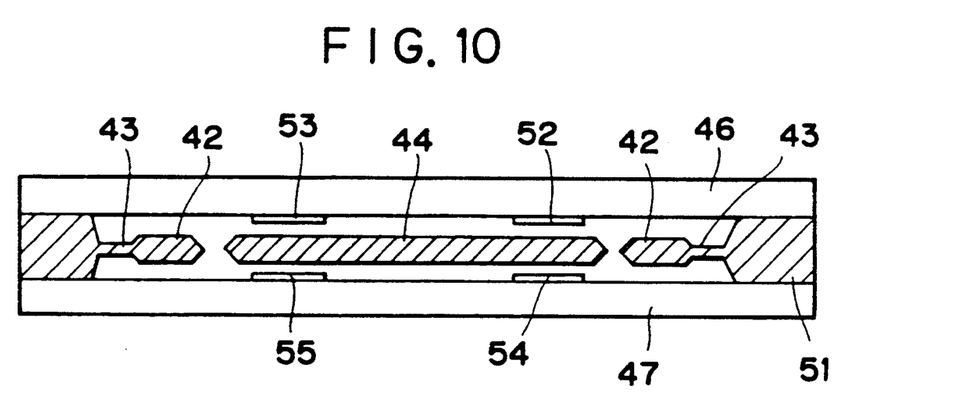
FIG. 10 is a cross-sectional view of the third embodiment taken along line B—B of FIG. 8.

FIG. 9 is a cross-sectional view of the third embodiment taken along line A—A of FIG. 8, and FIG. 10 is a cross-sectional view of the third embodiment taken along line B—B of FIG. 8. The portion shown in FIG. 8 is sandwiched between and joined to glass plates 46 and 47. Fixed electrodes 48 and 49 are provided on the underside of the upper glass plate 46 at locations facing the weight portions 42b and 42c, respectively, of the weight 42, and fixed electrodes 50 and 51 are likewise provided on the upper surface of the glass plate 47. Also, fixed electrodes 52 and 53 are provided on the glass plate 46 in face-to-face relationship with the vicinities of the opposite ends of the weight 44, and fixed electrodes 54 and 55 are provided on the glass plate 47 in opposed relationship with the fixed electrodes 52 and 53 with the weight 44 interposed therebetween.

Figure 11:
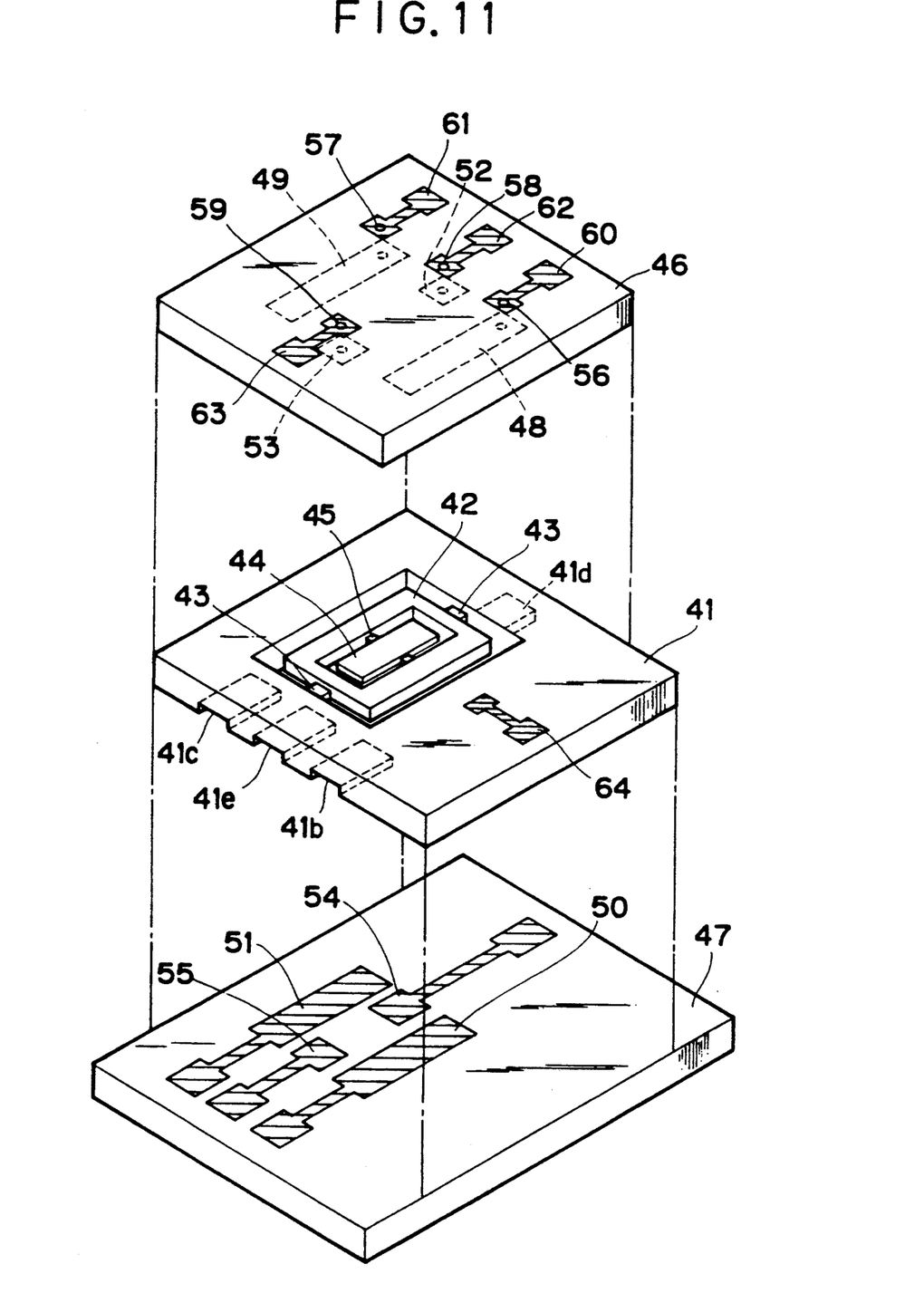
FIG. 11 is an exploded perspective view of the third embodiment.

FIG. 11 is an exploded perspective view of the third embodiment, and shows a method of drawing out the fixed electrodes 48–55. Fixed electrodes 48, 49, 52 and 53 on the underside of the glass plate 46 formed of Pyrex glass are connected to draw-out electrodes 60–63, respectively, on the upper surface of the glass plate 46 through through-hole electrodes 56–59, respectively. Fixed electrodes 50, 51, 54 and 55 on the upper surface of the glass plate 47 are drawn out to that portion in which the glass plate 47 protrudes out of the base plate 41, but grooves 41b–41e are formed in the underside of the base plate 41 so that the base plate 41 may not be short-circuited with these electrodes. An electrode 64 is provided on the upper surface of the base plate 41, and the glass plates 46 and 47 are joined to the base plate 41 by the anode joining method.

Figure 12:
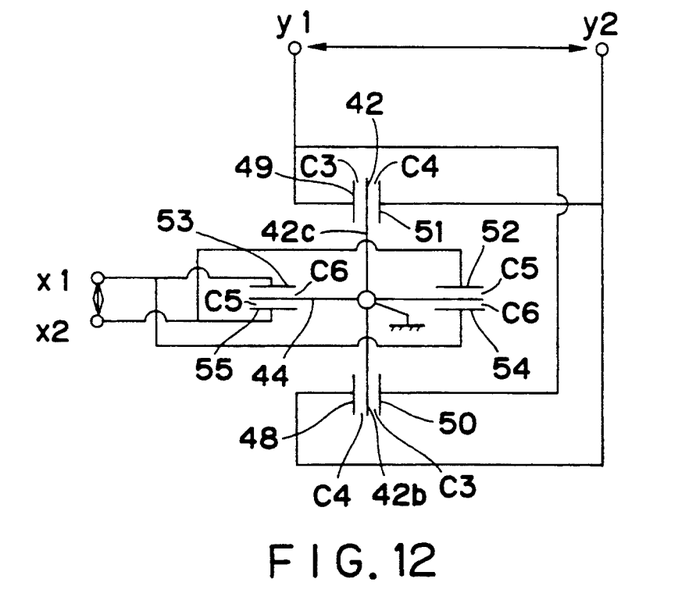
FIG. 12 is a diagram of the equivalent circuit of the detecting portion of the third embodiment.

Referring to FIG. 12 which is a diagram of the equivalent circuit of a detecting portion, the weight portions 42b and 42c of the weight 42 are electrodes (weight side electrodes) pivotable in the same direction relative to the base plate 41, and the weight 44 is an electrode (weight side electrode) pivotable in the same direction relative to the base plate 41 independently of these electrodes, and they are kept at a common ground potential. The fixed electrodes 48, 51 and the fixed electrodes 49, 50 are connected to each other, and form capacitors C3 and C4, respectively, between them and the weight 42, and output signals regarding the acceleration about the y-axis between terminals y1 and y2. The fixed electrodes 52, 55 and the fixed electrodes 53, 54 form capacitors C5 and C6, respectively, between them and the weight 44, and output signals regarding the acceleration about the x-axis between terminals x1 and x2.

Figure 13:
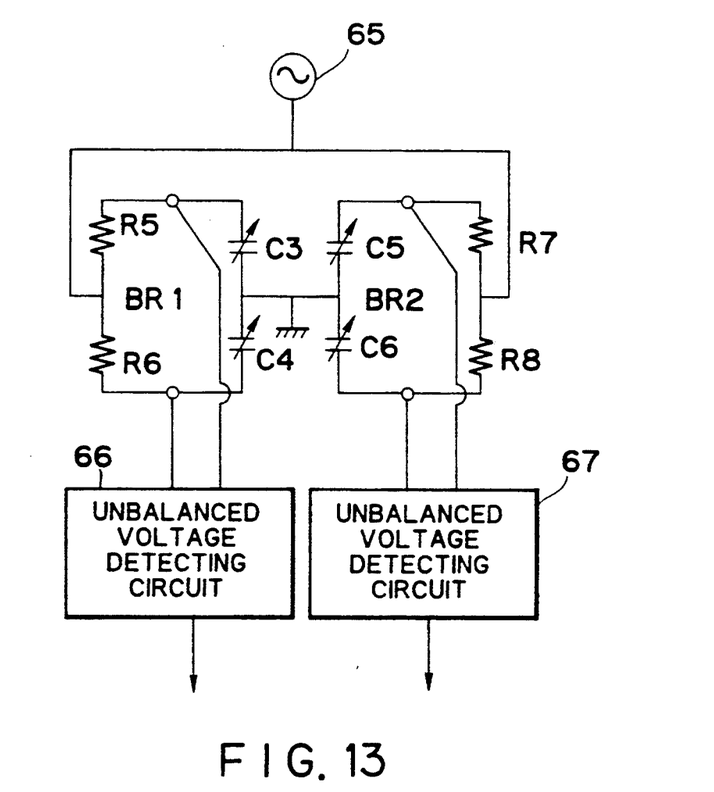
FIG. 13 shows the construction of the detection circuit of the third embodiment.

Referring to FIG. 13 which shows the construction of a detection circuit, the capacitors C3 and C4 are connected to resistors R5 and R6 to thereby constitute a bridge circuit BR1, and the capacitors C5 and C6 are connected to resistors R7 and R8 to thereby constitute a bridge circuit BR2. A high frequency voltage is applied from an oscillator 65 to the bridge circuits BR1 and BR2, the unbalanced voltages of which are input to unbalanced voltage detecting circuits 66 and 67, respectively, which are similar to the unbalanced voltage detecting circuit in the first embodiment.

Accordingly, when an angular acceleration is applied, the weight 44 pivots relative to the weight. 42 for the component about the x-axis with resilient support beams 45, 45 as the axis and the spacing thereof with respect to the fixed electrodes 52–55 varies, whereby the capacities of the capacitors C5 and C6 are varied, and the angular acceleration about the x-axis is detected (as the unbalanced voltage value) by the unbalanced voltage detecting circuit 67. Likewise, for the component about the y-axis, the weight 42 pivots with resilient support beams 43, 43 as the axis, and a variation in the spacing thereof with respect to the fixed electrodes 48–51 is detected by the bridge circuit BR1 and the unbalanced voltage detecting circuit 66 detects the angular acceleration component about the y-axis (as the unbalanced voltage value). These two voltage values may take such a form that they are converted into angular acceleration values by a calculator, not shown.

In such a construction, the weights 42, 44 and the resilient support beams 43, 45 are formed integrally with each other and therefore, it is easy to make the positions of the centers of gravity of the rotational axes of the weights 42 and 44 coincident with each other. That is, the angular accelerations of the two axes at the same position can be directly detected with good accuracy.

Further, if the detection circuit of the electrostatic servo type shown in the second embodiment is applied to the two-axis detecting portion shown in the third embodiment, the measurement range will be widened and sensitivity will be improved.

In the angular acceleration sensor according to any of the above-described embodiments, the translational acceleration component can be removed and the angular acceleration can be directly detected, and the planar weight is supported on a side of a planar plate by two resilient support beams and therefore, if this is used as the axis, the sensor is sensitive to rotation and at the same time, is high in rigidity to the angular acceleration about the axes orthogonal to each other and there is little crosstalk. The member on which the fixed electrodes in the present invention is provided may be any one having electrical insulativeness and of course, use may be made of ceramics or a silicon substrate or the like having an insulating layer.

As described above, the angular acceleration sensor according to each of the above-described embodiments is compact and simple in construction and directly detects the angular acceleration with good accuracy.

What is claimed is:

1. An angular acceleration sensor comprising:
   a first weight member having a first weight side electrode;
   a second weight member having a second weight side electrode, said second weight member being disposed around said first weight member;
   a first resilient member for supporting said first weight member from both sides thereof, said first resilient member being installed between said first and said second weight member, said first resilient member being disposed a first rotational axis and supporting said first weight member for rotation about said first rotational axis relative to said second weight member;
   a second resilient member for supporting said second weight member from both sides thereof, said second resilient member being disposed on a second rotational axis and supporting said second weight member for rotation about said second rotational axis;
   a first opposed electrode disposed so as to be opposed to said first weight side electrode, wherein an angular acceleration about an axis parallel to said first rotational axis is detected from a variation in electrostatic capacity corresponding to a variation in a spacing between said first opposed electrode and said first weight side electrode resulting from the rotation of said first weight member; and
   a second opposed electrode disposed so as to be opposed to said second weight side electrode, wherein an angular acceleration about an axis parallel to said second rotational axis is detected from a variation in electrostatic capacity corresponding to a variation in a spacing between said second opposed electrode and said second weight side electrode resulting from the rotation of said second weight member.

2. A sensor according to claim 1, wherein said second weight member is of a planar shape having an aperture open in central portion thereof, and wherein said first and second resilient members are disposed on the sides of said first and second weight members, respectively.

3. A sensor according to claim 1, wherein said first and second weight members and said first and second resilient members are etched on portions of a silicon substrate.

4. A sensor according to claim 1, wherein angular accelerations about axes parallel to said first and second rotational axes, respectively, are obtained from the value of the electrostatic capacity between said first weight side electrode and said first opposed electrode and the value of the electrostatic capacity between said second weight side electrode and said second opposed electrode, respectively.

5. A sensor according to claim 1, wherein said first rotational axis passes through the center of gravity of said first weight member, and wherein said second rotational axis passes through the center of gravity of a structure having said second weight member and said first weight member.

6. A sensor according to claim 3, wherein said first weight member comprises the first weight side electrode and both are formed of silicon, and wherein said second weight member comprises the second weight electrode and both are formed of silicon.

7. A sensor according to claim 1, wherein said first opposed electrode comprises first and second plate electrodes disposed opposite to each other, said first weight side electrode being interposed between said first and second plate electrodes, wherein said second opposed electrode comprises third and fourth plate electrodes disposed opposite to each other, said second weight side electrode being interposed between said third and fourth plate electrodes, wherein said first weight side electrode and said first plate electrode comprise a first capacitor, wherein said first weight side electrode and said second plate electrode comprise a second capacitor, wherein said second weight side electrode and said third plate electrode comprise a third capacitor, and wherein said second weight side electrode and said fourth plate electrode comprise a fourth capacitor.

8. A sensor according to claim 7, further comprising:
   a first bridge circuit comprising said first and second capacitors;
   a second bridge circuit comprising said third and fourth capacitors;
   an oscillator for applying a high frequency signal having constant amplitude to said first and second bridge circuits;
   a first detecting circuit for detecting unbalanced voltage generated in the first bridge circuit; and
   a second detecting circuit for detecting unbalanced voltage generated in the second bridge circuit.

* * * * *

UNITED STATES PATENT AND TRADEMARK OFFICE
CERTIFICATE OF CORRECTION

PATENT NO. : 5,349,858
DATED : September 27, 1994
INVENTOR(S) : Yagi et al.

It is certified that error appears in the above-indentified patent and that said Letters Patent is hereby corrected as shown below:

Column 1

Line 36, "dis-position" should read --disposition--.
    Line 45, "limitations" should read --spaced-apart--.

Column 2

Line 50, "the-torsion" should read --the torsion--.

Column 3

Line 55, "con,non" should read --common--.

Column 6

Line 31, "weight. 42" should read --weight 42--.

UNITED STATES PATENT AND TRADEMARK OFFICE
CERTIFICATE OF CORRECTION

PATENT NO. : 5,349,858
DATED : September 27, 1994
INVENTOR(S) : Yagi et al.

It is certified that error appears in the above-indentified patent and that said Letters Patent is hereby corrected as shown below:

<u>Column 7</u>
 Line 22, "disposed" should read --disposed on--.

Signed and Sealed this

Eleventh Day of April, 1995

*Attest:*

BRUCE LEHMAN

*Attesting Officer*  *Commissioner of Patents and Trademarks*